United States Patent Office 3,769,236
Patented Oct. 30, 1973

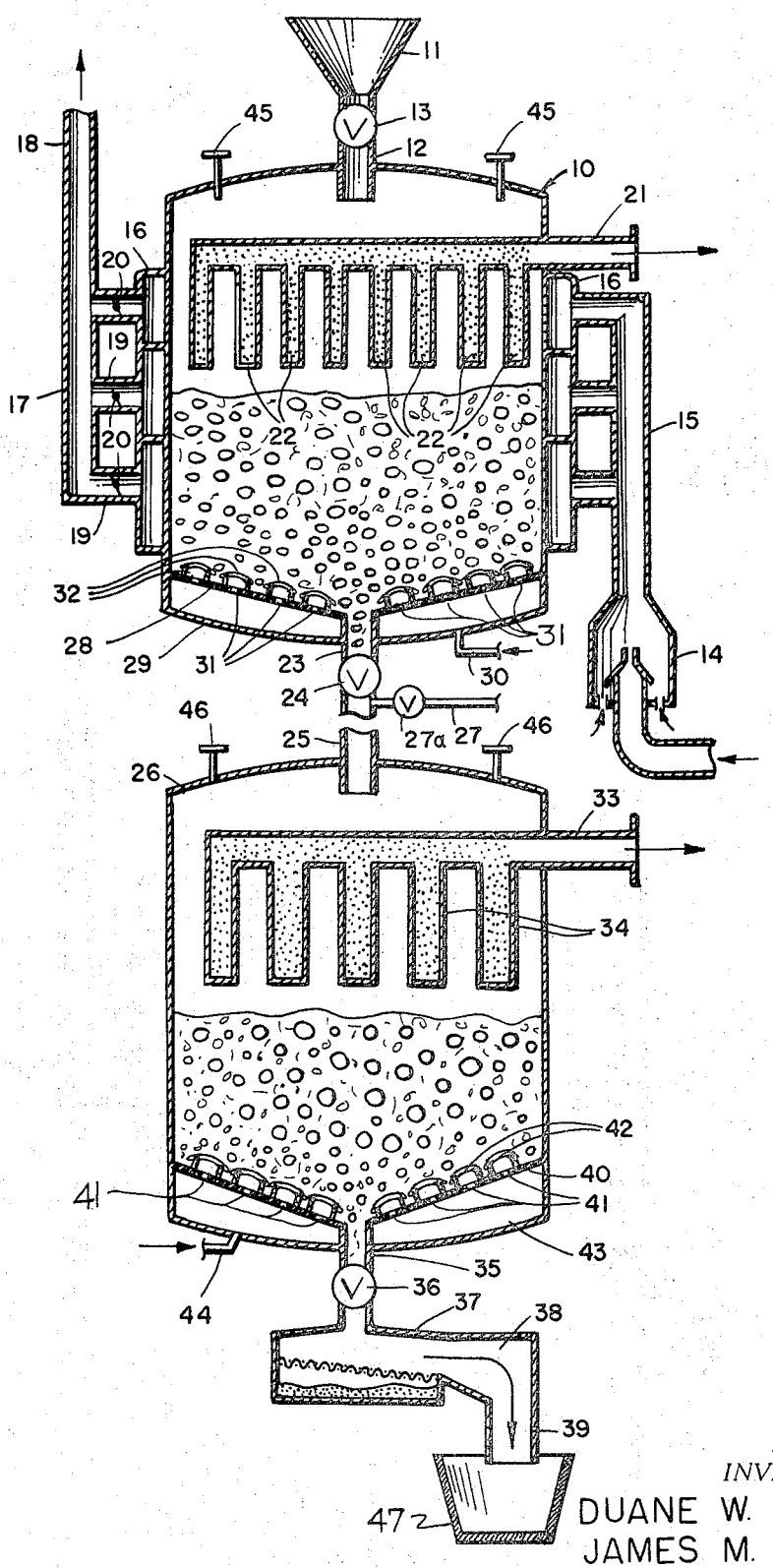

3,769,236
STABILIZED REDUCED COPPER-ZINC OXIDE CATALYST AND METHOD FOR THE PRODUCTION THEREOF
Duane W. Allen, Fern Creek, Ky., and James M. Moe, Manhattan Beach, Calif., assignors to Chemetron Corporation, Chicago, Ill.
Continuation-in-part of abandoned application Ser. No. 811,790, Apr. 1, 1969. This application Mar. 26, 1971, Ser. No. 128,482
Int. Cl. B01j 11/22
U.S. Cl. 252—463      9 Claims

ABSTRACT OF THE DISCLOSURE

Method of stabilizing copper-zinc oxide catalyst particles which comprises treating them in an inert gas stream with low concentrations of oxygen at 100–250° F. to oxidize 1–7% of the copper to copper oxide in the outer 10% of the particles.

CROSS-REFERENCE TO RELATED APPLICATION

This application is a continuation-in-part of our copending application Ser. No. 811,790 filed Apr. 1, 1969, now abandoned.

This invention relates to a stabilized, reduced copper-zinc oxide catalyst and to the production thereof. More particularly, the invention relates to the stabilization of a copper-zinc oxide catalyst which is effective in the water-gas shift reaction at low temperatures.

For many years, the reaction of carbon monoxide with steam to produce carbon dioxide and hydrogen has been an important commercial procedure for the production of hydrogen. The reaction is generally called the water-gas shift reaction and it is usually conducted with a copper-zinc oxide catalyst. It is desirable to conduct reaction at low temperature, that is, below about 500° F., because at low temperature the equilibrium is shifted in favor of the production of hydrogen and carbon dioxide and it is thus possible to produce an effluent gas stream containing not more than 0.5% carbon monoxide by volume. The usual catalyst precursor is a copper oxide-zinc oxide catalyst which in its oxide form is highly stable. When such catalyst precursor is used in the water-gas shift reaction, it is necessary to first treat it in a hydrogen stream at 250°–500° F. to reduce the copper oxide almost entirely to elemental copper, the zinc oxide being uneffected. The reduction reaction can be also carried out in the stream of water gas, because ordinarily such streams are produced by reaction of methane or other gaseous hydrocarbon and steam at high temperature and contain a mixture of carbon monoxide and hydrogen; thereafter water vapor (steam) is added to the stream of water gas to produce a suitable gas stream for the water gas shift reaction. When so reduced in situ, the copper-zinc oxide catalyst is highly active in catalyzing the water gas shift reaction.

The stabilization of a reduced copper-zinc oxide catalyst is different from the unrelated to the stabilization of reduced nickel catalysts as described by Ahlberg 2,677,669 (May 4, 1954). In the Ahlberg procedure, reduced nickel catalysts have been stabilized by controlled oxidation which converts about 50% (40–60% generally) of the elemental nickel to nickel oxide. When such stabilized nickel catalysts are used in hydrogen streams, the nickel oxide is quickly reduced to nickel and the nickel so produced is the catalytic metal. In the case of nickel, the reduction of the oxide to the metal is only slightly exothermic and the reduction of the nickel oxide does not upset the themodynamics of the system.

Copper catalysts, however, present an entirely different picture. Because the reduction of copper oxide to copper is highly exothermic (590 calories per gram) it is impossible to put a copper catalyst on stream in a hydrogen-containing atmosphere if there is any substantial amount of copper oxide in the catalyst. The heat produced would unduly increase the temperature of the system and render temperature control impossible. This is especially true in the water-gas shift reaction where temperature should be maintained at relatively low temperature. In addition the catalyst would overheat and have its activity destroyed. Therefore, it has been found that stabilized copper catalysts cannot contain more than 10% copper oxide, and preferably less, if they are to be used in the shift reaction.

The controlled partial oxidation of reduced elemental copper catalysts is different from the controlled oxidation of reduced nickel catalysts because it cannot be allowed to proceed beyond 10% CuO formation. It is desirable to produce partially oxidized copper-zinc oxide catalysts which are stable under ordinary conditions and yet effective in the water gas shift reaction immediately when brought up to temperature, thus avoiding the preliminary reduction step which has been heretofore required for stable copper oxide-zinc oxide compositions. Because reduced copper-zinc oxide catalysts are ordinarily highly pyrophoric and therefore very difficult to handle, it is desirable to provide a method of stabilizing such reduced catalysts so that they may be used without special precautions, transported in ordinary containers and handled in ordinary equipment.

It is an object of this invention to provide stabilized reduced copper-zinc oxide catalysts.

Another object is to provide method of partially oxidizing copper-zinc oxide catalysts to provide stabilized catalysts containing not more than 10% CuO.

It is a further object of this invention to provide methods for producing such catalysts.

These and other objects are apparent from and are achieved in accordance with the following disclosure.

In accordance with this invention, pellets of a copper oxide-zinc oxide catalyst precursor are reduced in an inert gas stream with small quantities of hydrogen under controlled conditions. The reaction of copper oxide with hydrogen is highly exothermic and it is necessary to control the concentration of hydrogen in the gas stream so that the reaction does not proceed too rapidly. In the preferred procedure, the vessel containing pellets of copper oxide-zinc oxide catalyst precursor in a stream of inert gas such as natural gas, carbon dioxide, nitrogen and the like, is heated to raise the temperature of the pellets to about 350° F. to 375° F. The hourly space velocity of the gas stream, that is the volumes of gas per hour passed through a given volume of catalyst pellets, is usually maintained at about 1000. Hydrogen is introduced in the gas stream at a low concentration of about 1.2 mole percent. The reaction of hydrogen with copper oxide is exothermic and raises the temperature of the catalyst pellets to about 400°–420° F. When the reaction subsides, as indicated by a drop in temperature in the catalyst pellets, the temperature of the inert gas is raised to about 375° F. After the exothermic reaction has subsided, the temperature is raised again to about 400° F. After the reaction has subsided at 400° F. the hydrogen concentration is increased to about 3 mole percent and the procedure continued until the exothermic reaction subsides and the catalyst temperature falls below 400° F. At this point, the hydrogen concentration is raised to about 5 mole percent and the procedure repeated. Throughout the operation, the catalyst temperature is maintained at a value not exceeding 450° F.

When no hydrogen is consumed at 400° F. and 5 mole percent hydrogen concentration, the system is purged of hydrogen with inert gas, the catalyst temperature adjusted to about 100° F. and a small quantity (1–2% by volume) of air is introduced into the carrier gas stream. The concentration of air (or oxygen) in the carrier gas stream is controlled so that the temperature of the catalyst does not exceed 250° F., lower values from 150° to 200° F. being preferred. When the temperature in the catalyst falls, indicating that oxidation has ceased, the concentration of air is increased gradually to 5% by volume until no further temperature change is indicated. The catalyst is then considered stabilized and can be removed from the vessel and packaged in ordinary fiberboard containers.

With pellets, tablets, pills or other three-dimensional solid forms of copper-zinc oxide catalysts, the stabilization is accomplished by controlled oxidation of the elemental copper to copper oxide, mainly on and near the surface of the catalyst particle. This is done by adding to the inert gas surrounding the catalyst particles small quantities of oxygen while the catalyst is maintained at a temperature between 100° and 250° F., causing oxidation of 1–10% of the elemental copper. The amount of copper oxide in the outer 10% of the pellet volume is about 30% greater than average throughout the pellet.

The inert (nonoxidizing) gas surrounding the catalyst particles after reduction of the copper oxide to copper is preferably nitrogen, although monatomic gases, steam and natural gas are suitable, as are mixtures. When steam is used it generally replaces the nitrogen and other gases surrounding the catalyst particles during the course of the treatment. Then traces of oxygen (usually in the form of air) are admitted to the gas stream passing through the catalyst bed so that an oxygen concentration of 0.2% to 0.5% by volume is established while the catalyst bed is at a temperature between 100° and 250° F., preferably between 100° and 150° F. When the temperature of the catalyst bed ceases rising, the oxygen concentration is increased by 25% to 100% of the initial concentration and the gas flow continued while the catalyst bed is kept at a temperature between 100° and 250° F. When the bed temperature ceases rising, the oxygen concentration is further increased by an increment of 25% to 100% and the procedure repeated until the oxygen concentration reaches about 1% by volume and no further bed temperature rise is noted. The catalyst is then stabilized.

During the controlled oxidation of the copper-zinc oxide catalyst particles, the oxidation takes place largely on the surface and outer 10% of the volume of the particles. Usually about 1% to 7% of the reduced copper is oxidized to copper oxide in this treatment; the preferred amount in 3–5% copper oxide.

The invention is further disclosed by reference to the attached single sheet of drawing representing apparatus in which the reduction and stabilization of the catalyst is conducted. In the attached drawing, vessel 10 is a reduction furnace equipped with an inlet funnel 11 and tube 12 containing a flow valve 13 to control the rate of input of copper oxide-zinc oxide pellets. The vessel 10 is heated by means of a gas burner 14 connected by a manifold 15 to a heating jacket 16 surrounding the vessel 10. The heating jacket 16 is connected to an exhaust manifold 17 and an exhaust stack 18 by conduits 19 equipped with dampers or valves 20. An exhaust manifold 21 is located near the top of the furnace vessel 10 and projects into the upper part of said furnace vessel with a series of a porous filter tubes 22 depending therefrom into the central region of the furnace. The bottom of the furnace is connected to an outlet conduit 23 and a water-cooled valve 24 through which reduced catalyst pellets are removed from the furnace 10 and conducted by gravity feed through a conduit 35 into a stabilization vessel 26. To the conduit 25 a gas line 27 is connected to provide a supply of nitrogen or carbon dioxide to the conduit 25, controlled by a valve 27a. The stabilization vessel 26 is equipped with outlet manifold 33 which leads into the upper section of the vessel and has a series of porous filter tubes 34 depending therefrom into the central area of the unit. The bottom of the stabilization vessel is connected to a conduit 35 and a valve 36 leading to a solid separator 37 from which fine particles of catalyst materials are separated from the catalyst pellets which are removed by a line 39 into a receptacle 47 for packaging and shipment.

In the operation of the invention, copper oxide-zinc oxide catalyst pellets are fed through the funnel 11, valve 13 and the conduit 12 into the reduction furnace 10 to a level approximately equal to the top of the manifold 21, thereby surrounding the porous filter tubes with pellets. A stream of inert gas, such as nitrogen, is fed through the line 30 into the conduits 31 and up into the vessel 10. The stream of inert gas is continued until oxygen is purged from the vessel 10 as measured on the gas stream passing out of the vessel 10 through the manifold 21 and line 21a. When the oxygen is purged from the vessel 10, the temperature is adjusted by the burner 14 and heating jacket 16 and measured by thermocouples (not shown) inserted into thermocouple wells 45 which projects downward into the vessel 10. When the temperature of the catalyst charge, as measured by the thermocouples in the thermocouple wells 45, has reached the proper range, a stream of hydrogen gas is fed into the nitrogen gas stream to bring the hydrogen concentration in the gas stream to approximately 1 mole percent. This gas stream is passed into the vessel 10 via the line 30 and conduits 31 and through the catalyst charge in the vessel 10 at an hourly space velocity in the range of 500 to 1000, the rate being so adjusted that the temperature of the catalyst does not exceed 400°–420° F. When hydrogen is no longer being consumed in reducing the copper oxide of the copper oxide-zinc oxide catalyst pellets in the vessel 10, the exothermic reaction decreases or ceases and the temperature of the catalyst charge drops. When the catalyst temperature drops, the temperature of the inlet gas stream is then raised approximately 25° F. If there is no further hydrogen absorption at the higher temperature, the temperature is further raised approximately 25° F. If there is no further reaction, as noted by the temperature change of the catalyst charge, then the hydrogen concentration is increased to approximately 3 mole percent and then further to 5 mole percent. Throughout the reaction the temperature of the catalyst is maintained at a temperature not exceeding 450° F. When no further reaction occurs at a catalyst temperature of approximately 400° F. and a hydrogen concentration of 5 mole percent, the catalyst is considered adequately reduced.

The gas burner 14 is turned off and the catalyst charge is allowed to cool to approximately 100° F. at which time the valve 24 is opened and the catalyst charge is allowed to fall by gravity via the conduits 23 and 25 into the stabilization unit 26 which has been previously purged with nitrogen or other inert gas via a line 44 to remove oxygen therefrom. Then a small concentration of air is admitted into the inert gas stream in the line 44 when the temperature of the catalyst pellets in the vessel 26 has fallen to the proper level for controlled oxidation of the copper-zinc oxide catalyst. The concentration of air (or oxygen) in the gas stream flowing into the vessel 26 via the line 44 and the conduit 41 is controlled so that the temperature of the catalyst pellets, as measured by thermocouples (not shown) in thermocouple wells 46, does not rise above about 150° F. As the speed of the oxidation reaction decreases, the concentration of oxygen in the gas stream is increased gradually until it reaches about 5% (by volume), care being taken that the catalyst temperature does not exceed about 150° F. The catalyst is then stabilized against oxidation and can be removed from the vessel 26 via the conduit 35 and the valve 36.

In the reduction of the copper oxide-zinc oxide composition to a copper-zinc oxide catalyst, the temperature of the composition is kept in the range from 350° F. to 450° F. by controlling the heating jacket 16 and the input rate of hydrogen. In the stabilization of the copper-zinc oxide catalyst by controlled oxidation, the catalyst is maintained at a temperature not exceeding 150° F. by adjusting the concentration of oxygen in the inert gas stream, usually to a value between 1% and 5% air (by volume) in the gas stream.

The catalyst precursor which is reduced and stabilized by the procedure of this application preferably comprises approximately ⅓ copper oxide and ⅔ zinc oxide by weight, with or without an inert support material such as alumina which can constitute 0–30% of the weight of the total oxide mass, preferably 15–20%. Generally the catalyst precursor contains 25–40 parts by weight of copper oxide and 60–85 parts of zinc oxide, with 0–30 parts of alumina. Such catalyst precursors can be produced by coprecipitation of copper and zinc hydroxides or oxides from solutions containing copper and zinc ions by treatment with alkali, adding hydrated alumina to the precipitate, if desired, and calcining the mixture, or they can be produced by mulling a wet mixture of copper and zinc oxides, with or without hydrated alumina, and calcining the resulting composition.

The reduced, stabilized catalysts produced in accordance with the procedure described herein contain, in relative proportions, about 25 to 40 moles of copper and copper oxide combined with about 60 to 75 moles of zinc oxide, with optional amounts of inert support material such as alumina. About 1% to 7% by weight, and not more than 10%, of the copper is in the form of copper oxide.

The invention is described in more detail by means of the following examples, which are illustrative only. It will be apparent that the relative proportions of materials and the operating conditions can be varied within the range disclosed herein.

Example 1.—Catalyst precursor preparation (A) A mixture of 262 lbs. of basic copper carbonate (55% Cu) and 375 lbs. zinc oxide (U.S.P.) was placed in a muller and mulled for five minutes. To this mixture was added slowly 139 lbs. of aqua ammonia (29%) diluted with 75 lbs. of water at 120° F. while mulling was continued for 20 minutes. The product was calcined at 800–850° F. for six hours. It was passed through No. 4 and No. 10 sieves, mixed with 3% graphite, sprayed with 10% water, slugged, passed through No. 4 and No. 10 sieves, pressed into ¼ inch by ¼ inch tablets and dried at 250° F. The tablets contained 66.7% ZnO and 33.3% CuO.

(B) Copper shot (1270 grams, 99.96% Cu) was dissolved in 15.80 liters of 63% nitric acid. Then 2615 grams of zinc shot (99.98% Zn) was dissolved in the acid. The solution was diluted to 50 gallons with water and heated to 110° F. Then sufficient 29% aqua ammonia was added at a rate of 60 ml./minute to raise the pH of the solution to 6.6 to 6.8. The total time required for the ammonia addition was 4.5 to six hours, during which time oxides of copper and zinc precipitated. The slurry of oxides was filtered in a filter press. The oxide mixture was air dried, mulled with 1870 grams of alumina trihydrate for one hour, then dried at 250° F. for four hours and calcined at 800° F. for eight hours. The oxide mixture contained 26.3% CuO, 53.5% ZnO and 20.2% $Al_2O_3$.

2500 grams of the calcined oxide mixture was dry mulled with 100 grams of graphite for five minutes. An aqueous emulsion of polyvinyl acetate (102 grams of polyvinyl acetate in 204 grams of water) was added and mulling continued for five more minutes. The product was air dried overnight, slugged into ½" slugs, passed through a No. 12 sieve and formed into ⅛ inch by ⅛ inch pellets. The pellets were calcined for two hours at 400° F., two hours at 600° F. and eight hours at 800° F.

Example 2.—Catalyst production and stabilization (A) A 3600 lbs. batch (about 40 cubic feet) of copper oxide-zinc oxide (1:2 weight ratio) catalyst precursor pellets (¼" x ⅛") was placed in a jacketed reactor 5.9 feet in diameter to form a bed 2.95 feet deep. The reactor was equipped with four thermocouple wells extending into the bed of catalyst precursor, each containing three thermocouples at different levels. A series of 18 porous filter tubes, each 36 inches in length and 2 inches in diameter, extended from a manifold into the center of the bed. Nitrogen was passed through the bed from an inlet at the bottom of the reactor and out through the porous filter tubes and manifold. When the reactor was purged of oxygen, it was heated to 350° F. by means of the gas heater and heating jacket. The effluent gas stream was analyzed periodically to make sure that it contained no measurable oxygen or water vapor. Then hydrogen was mixed with the nitrogen stream at a concentration of 1 mole percent and this stream was heated to 350° F. and passed through the bed at an hourly space velocity of 500 (20,000 s.c.f.h.). The temperature of the catalyst precursor pellets rose to 400° F. over a period of three hours and remained between 400° F. and 350° F. for three more hours. Then the pellet temperature was raised to 375° F. while the gas stream containing 1 mole percent hydrogen was heated to 375° F. and passed through the bed, the temperature rising to 410° F. in two hours, then subsiding to 375° F. in four hours. The pellet bed temperature was next raised to 400° F. while the gas stream containing 1 mole percent hydrogen was passed through it at 400° F., the bed temperature rising to 420° F. in two hours, and then falling to 400° F. over a four-hour period. Then the hydrogen concentration in the gas stream was raised to 2 mole percent and the bed maintained at 400–420° F. for four hours. The hydrogen concentration was next raised to 3 mole percent and passed through the bed at 400–420° F. for four hours. Then the hydrogen concentration was increased to 5 mole percent and flowed through the pellets at 400–420° F. for six hours.

The catalyst pellets were transferred from the reactor via gravity feed to a bed in a stabilizer vessel of the same size equipped with similar thermocouple wells and thermocouples and 18 porous filter tubes depending from an outlet manifold. The vessel had been previously purged with nitrogen and a slow stream of nitrogen was passed up through the catalyst bed and out of the porous filter tubes and manifold. When the catalyst bed had cooled to about 150° F. the stream of nitrogen was adjusted to an hourly space velocity of 500 (about 20,000 s.c.f.h.) and admixed with about 1% air by volume. The concentration of air was controlled so that the temperature of the catalyst bed did not exceed 150° F. After about four hours the temperature fell to below 120° F., at which time the concentration of air in the gas stream was raised gradually to about 2% by volume over a period of two hours, care being taken that the catalyst temperature did not exceed 150° F. Then the concentration of air was increased gradually to 8% by volume over a period of eight hours, while the catalyst temperature was held between 125° and 150° F. When the 8% level was reached, the catalyst pellets were completely stabilized. They were removed from the vessel, screened to remove fines and packed in fiberboard containers.

In the catalyst pellets so produced, 93% of the copper was elemental copper. They were steamed at 400° F. and 2500 hourly steam velocity for one-half hour, then put on a stream in water gas. The flow of gas (steam and carbon monoxide) over the catalyst pellets was gradually raised to a dry hourly space velocity of 2500 over one-half hour. The initial catalyst activity ($K_w$) at 400° F. and 4400 and at 500° F. was 6900 at 2500 dry hourly space velocity.

(B) A 50 cu. ft. charge of copper oxide-zinc oxide catalyst precursor pellets (¼" x ⅛" tablets) was placed in a cylindrical furnace in a horizontal bed 6 feet in diameter and 22 inches deep. Thermocouples were placed in the center, on the bottom, on the top and above the pellet bed. The furnace was purged with a stream of nitrogen and heated to a bed temperature of 365° F. The exit gas was cooled in a condenser to remove water. After the free water had been removed from the catalyst precursor, hydrogen was introduced into the nitrogen stream at a concentration of 1.2 mole percent. As the reaction of hydrogen with copper oxide progressed, producing elemental copper in a highly active state, the catalyst bed temperature increased to 430° F. The temperature was controlled between 400° and 430° F by adjusting the inlet flow of hydrogen. After 40 hours, no further consumption of hydrogen occurred. The catalyst bed was cooled to 225° F., purged with nitrogen and treated with 225° F. steam for five hours.

During the five-hour steam treatment, controlled amounts of air were admixed with the stream of steam to affect surface oxidation of the elemental copper. First, 1% air by volume was introduced into the steam and the temperature was maintained at 225–250° F. After two hours the concentration of air in the stream of steam was increased to 1.5% and the temperature maintained below 250° F. Then after two more hours the air concentration was raised to 2% by volume and the temperature maintained at 225–250° F. Finally the air concentration was increased to 5% by volume for an additional hour. The gas streams were then cut off, the furnace cooled and the contents removed.

The catalyst so treated was 90% reduced to elemental copper. It was stable in the atmosphere, could be packed in ordinary drums and was highly active in the water gas shift reaction. A 40 cu. ft. charge of this catalyst was tested in the water gas shift reaction at 400° F. Steam at 400° F. and 2500 S.V. was passed over the catalyst for ½ hour, then a gas stream containing carbon monoxide (15.7% by volume), carbon dioxide (5.6% by volume), hydrogen (55.1% by volume) and nitrogen (23.6% by volume) was introduced gradually into the stream. The gas stream flow rate was increased until after 30 minutes it replaced the steam. During this period, the temperature of the catalyst bed rose to about 400° F. The activity of this catalyst ($K_w$) was 3300 at 400° F. and 5500 at 500° F.

We claim:
1. Method of stabilizing a copper-zinc oxide pyrophoric catalyst containing reduced elemental copper which comprises:
   (a) surrounding said catalyst with a nonoxidizing gas stream,
   (b) heating said catalyst to temperature between 100° to 250° F.,
   (c) adding oxygen to said gas stream to a concentration of 0.2% to 0.5% by volume,
   (d) maintaining the catalyst temperature between 100° and 250° F.,
   (e) continuing the flow of said gas stream containing 0.2% to 0.5% oxygen by volume until the oxidation reaction ceases,
   (f) increasing the oxygen concentration in said gas stream by 25–100% of the initial concentration and continuing the gas flow while maintaining the catalyst temperature below about 250° F. until the oxidation reaction ceases,
   (j) stepwise increasing the oxygen concentration in the gas stream by increments of 25–100% while maintaining the catalyst temperature below about 250° F. until the oxygen concentration reaches about 1% by volume, and
   (h) continuing the flow of the gas stream through the catalyst until the oxidation reaction ceases.

2. Method of claim 1 wherein the gas stream is nitrogen.
3. Method of claim 1 wherein the gas stream is steam.
4. Method of claim 1 wherein the catalyst is produced by the reduction of a precursor containing 25–40% copper-oxide and 60–75% zinc-oxide.
5. Method of claim 4 wherein the catalyst precursor contains 0–30% alumina.
6. Method of claim 3 wherein the catalyst is maintained at a temperature between 225° F. and 250° F.
7. A stabilized copper-zinc oxide catalyst pellet which is effective in the water-gas shift reaction at temperatures below 500° F., comprising copper and zinc oxide, the ratio of copper to zinc oxide being in the range of 25–40 moles of copper combined with 60–75 moles of zinc oxide, at least 1% and not more than 10% of the copper being in the form of copper oxide.
8. A catalyst pellet as defined by claim 7 wherein the amount of copper oxide in the outer 10% of the pellet is about 30% greater than the average throughout the pellet.
9. A catalyst pellet as defined by claim 8 wherein 1% to 7% of the copper is in the form of copper oxide.

References Cited
UNITED STATES PATENTS

| | | | |
|---|---|---|---|
| 2,677,669 | 5/1954 | Ahlberg | 252—172 |
| 3,303,001 | 2/1967 | Dienes | 23—213 |
| 3,388,972 | 6/1968 | Reitmeier | 23—213 |

DANIEL E. WYMAN, Primary Examiner

W. J. SHINE, Assistant Examiner

U.S. Cl. X.R.

252—475, 476, 477 Q